United States Patent [19]

Roy

[11] Patent Number: 5,327,342
[45] Date of Patent: Jul. 5, 1994

[54] METHOD AND APPARATUS FOR GENERATING PERSONALIZED HANDWRITING

[76] Inventor: Prannoy L. Roy, B-213, Greater Kailash-I, New Delhi, India, 110 048

[21] Appl. No.: 136,598

[22] Filed: Oct. 14, 1993

Related U.S. Application Data

[63] Continuation of Ser. No. 668,894, Mar. 31, 1991, abandoned.

[51] Int. Cl.⁵ ............................................... G06F 15/38
[52] U.S. Cl. ...................................... 364/419.1; 382/2; 382/13; 364/419.11; 364/419.13
[58] Field of Search ........... 364/419.1, 419.11, 419.13, 364/419.14, 419.09; 382/2, 13

[56] References Cited

U.S. PATENT DOCUMENTS

| | | | |
|---|---|---|---|
| Re. 34,476 | 12/1993 | Norwood | 382/13 |
| 4,024,500 | 5/1977 | Herbst et al. | 340/146.3 |
| 4,817,034 | 3/1989 | Hardin, Sr. et al. | 382/2 |
| 5,050,219 | 9/1991 | Maury | 382/3 |
| 5,050,221 | 9/1991 | Ohta et al. | 382/9 |
| 5,108,206 | 4/1992 | Yoshida | 400/61 |

*Primary Examiner*—Roy N. Envall, Jr.
*Assistant Examiner*—Ari M. Bai
*Attorney, Agent, or Firm*—Merchant, Gould, Smith, Edell, Welter & Schmidt

[57] ABSTRACT

An apparatus and method for processing text to produce simulated handwriting and more particularly, an apparatus and method for producing handwriting that simulates the user's own handwriting.

12 Claims, 13 Drawing Sheets

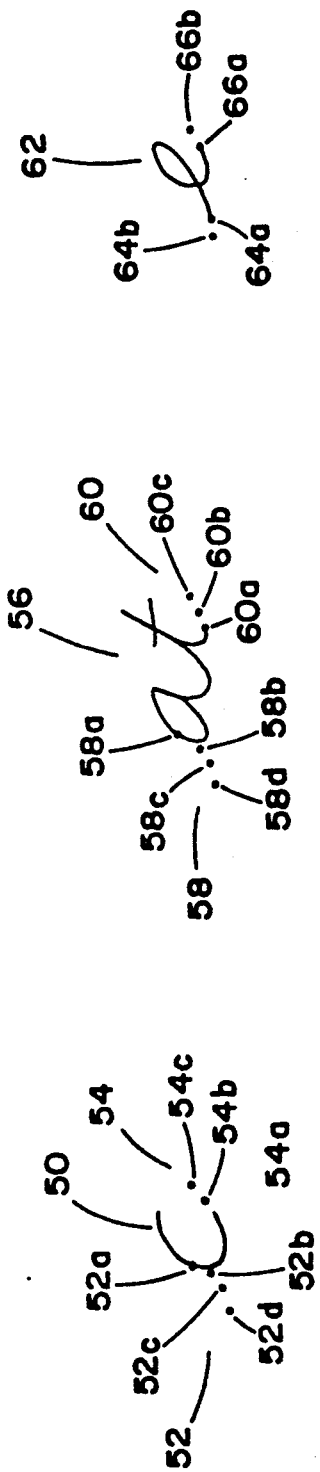
FIG. 6A
FIG. 6B
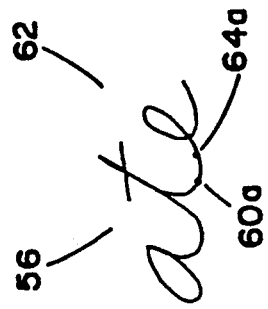
FIG. 6C
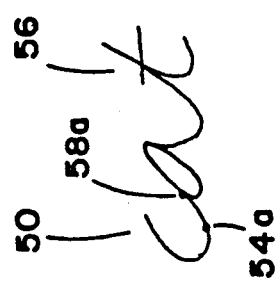
FIG. 6D
FIG. 6E

FIRST MARK

SECOND MARK

FINAL MARK

RESULT

FIRST MARK

SECOND MARK

FINAL MARK

RESULT

METHOD AND APPARATUS FOR GENERATING PERSONALIZED HANDWRITING

This is a continuation, of application Ser. No. 07/668,894, filed Mar. 31, 1991 now abandoned.

BACKGROUND OF THE INVENTION

1. Field of the Invention

The present invention relates to an apparatus and method for processing text to produce simulated handwriting, and more particularly to an apparatus and method for producing handwriting that simulates the user's own handwriting.

BACKGROUND OF THE INVENTION

One of the first attempts at simulating handwriting was disclosed in U.S. Pat. No. 1,476,818 issued to Herrman on Dec. 11, 1923. Herrman discloses a typewriter that, in addition to the normal typewriter keys, has keys dedicated to nonoverlapping fragments of graphical images such as signatures. A signature is reproduced by striking keys of the typewriter in a predetermined sequence.

The approach disclosed by Herrman can reproduce a limited number of graphical images. However sets of keys must be dedicated to each image and changes, such as substituting an alternate signature, require modification of the typewriter apparatus.

An apparatus based on Herrman could be used to generate a document that approximates a handwritten document. However, Herrman relies on the substitution of images for words. Each word or group of words in the document must have its own image and therefor its own set of keys. Even the singular and plural versions of a word would require two separate images. Even documents with a relatively small number of words would rapidly overwhelm this approach.

The Herrman apparatus illustrates some of the obstacles that must be overcome in order to simulate handwriting on any kind of scale. Devices that simulate handwriting should have an adequate vocabulary. The typical everyday vocabulary in the English language is approximately 1000 words. This means that a working vocabulary in the thousands of words may be required. This vocabulary cannot be static. It is critical for a useful handwriting device to be able to add and delete words and symbols to keep pace with changing requirements. And, finally, handwriting devices must operate within certain constraints in order to mimic human handwriting. Letters must flow together within a word in order to simulate the natural flow of a writing instrument. And the result cannot look too perfect. That is, the spacing between words, the appearance of a word and the distance from a word to the left or right margin should not appear uniform.

An alternate approach to simulating handwriting is to substitute handwriting style characters for characters in the original text document. The proliferation of computers and the widespread use of word processing programs has created a market for alternate font styles in document reproduction. Some of these fonts have been designed to have the appearance of handwriting. A few fonts have letters with tails designed to flow naturally into an adjacent letter in a style typical of some forms of calligraphy. In the font substitution method, individual letters in text documents are replaced by their associated font character. An example of device implemented in this fashion is the InScribe ™ System offered by InScribe, Inc. The InScribe ™ System is a computer calligraphy system that can convert text to certain types of calligraphy.

A slightly different approach is described in U.S. Pat. No. 4,604,712 issued to Orrhammar on Aug. 5, 1986. Orrhammar discloses a system for font substitution of Arabic characters that substitutes a font as a function of whether the character stands alone, is inside a word or begins or ends a word.

A font substitution system has by nature an almost infinite vocabulary. If the fonts are designed correctly, adjacent letters in words will appear to flow naturally. In fact, the InScribe ™ System described above can be used with a pen plotter to give the appearance of human rendering of the document produced.

There are disadvantages in using a font system for simulating handwriting. The variety of fonts is usually limited, with no simple mechanism for adding new fonts. Generated documents have the look of being produced by a select group of calligraphers. In some instances, it is more desireable to be able to generate documents that appear to be handwritten by the individual. This would be very difficult with a font substitution system. In addition, many people modify the shape of their handwritten letters according to the location of the letter in a word. A letter replacement strategy such as in a font system is incapable of differentiating the placement of a letter within a word. Even with the approach disclosed by Orrhammar, this tends to produce a uniform word that diminishes the human rendered appearance of the document.

It is apparent that there is a need for a device that can realistically simulate personal handwriting. The device should be capable of reading a text document and generating a new document that appears to be written in an individual's own handwriting.

SUMMARY OF THE INVENTION

The present invention provides a device for the conversion of text into graphical images that simulate handwriting. A dictionary is provided that contains words, letters and symbols that can be directly reproduced as graphical handwriting images. A document is read into the device. The words in the document are compared to a list of the graphical images in the dictionary. Words that are in the dictionary are replaced with the associated graphical image. Words that are not in the dictionary are decomposed into a sequence of words, letters and symbols that do exist in the dictionary. The resulting sequence is replaced with a sequence of associated graphical images and modified to form a contiguous word image.

According to another aspect of the present invention, words, letters and symbols are added to the dictionary by scanning handwritten samples. The size and appearance of words, letters and symbols within the dictionary can be modified through user interaction with the device.

According to yet another aspect of the invention, a plurality of handwriting images is associated with a word, letter or symbol within the dictionary. The device randomly selects the image to be used to replace that word, letter or symbol. This increases the appearance of variation in resulting documents.

According to yet another aspect of the present invention, a handwritten document can be given the appearance of a totally different writing style by installing a different dictionary and executing the conversion process again.

According to yet another aspect of the present invention, words or phrases can be translated into a different language and expressed in a form with the appearance of handwriting by installing a different dictionary and executing the conversion process again.

According to yet another aspect of the invention, spacing between adjacent words and between a word and the left or right margin is selected randomly between two limits. This also increases the look of variation in resulting documents.

According to yet another aspect of the invention, the resulting document can be reproduced on paper through the use of a pen plotter or printing device to produce a realistic approximation to an individual's own handwriting.

BRIEF DESCRIPTION OF THE DRAWINGS

FIGS. 6a through 6e illustrate the combination of joinable words and letters to form words not included in the installed dictionary.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments, in which the invention may be practiced. It is to be understood that other embodiments may be utilized and structural changes may be made without departing from the scope of the present invention.

Figure 1:
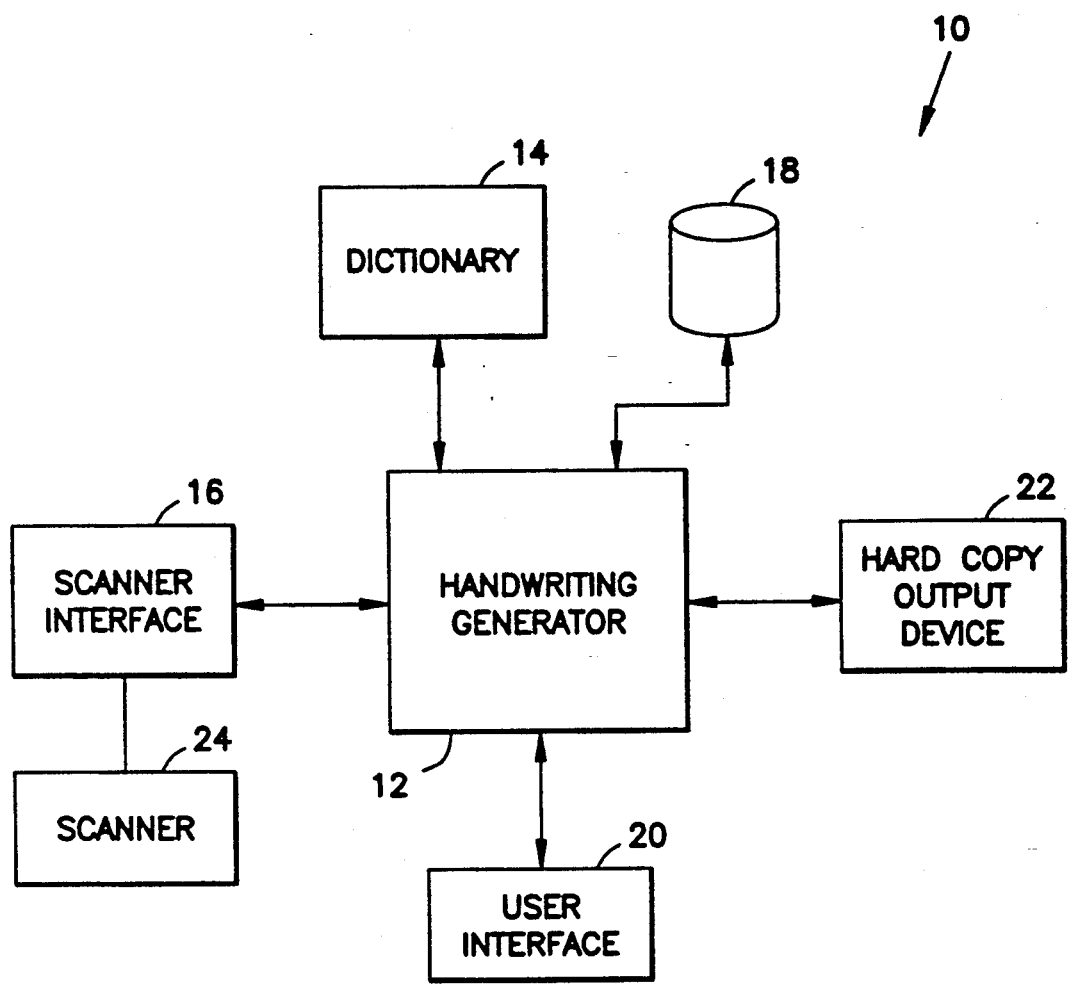
FIG. 1 is a block diagram representative of a system for simulating handwriting according to the present invention.

A personalized handwriting system 10 for simulating an individual's handwriting is illustrate generally in FIG. 1. In system 10, handwriting generator 12 is connected to dictionary 14, scanner interface 16, storage device 18, user interface 20 and hard copy output device 22. Scanner interface 16 is also connected to scanner 24. Handwriting generator 12 is used to produce a simulated handwritten document by substituting handwriting images for the words, letters and symbols in the original text document. Handwriting images associated with a particular handwriting style are stored in dictionary 14. Handwriting images in dictionary 14 are archived in storage device 18. User interface 20 provides a means for entering text documents and a mechanism for user manipulation of handwriting images and of the resulting handwritten document. Hard copy output device 22 is used to reproduce the simulated handwritten document on paper. Scanner 24 and scanner interface 16 are used to add new handwritten images to system 10.

Handwriting generator 12 operates by comparing character strings in the original text document to a list of character strings with available handwriting images maintained in dictionary 14. If there is a match, the character string is replaced by its handwritten analog in a new document. If no match is found in dictionary 14, an equivalent handwritten image is created by decomposing the original character string into character strings and letters that are represented in dictionary 14. A composite handwritten word is then generated by joining adjacent handwriting images within the word using conventional curve fitting algorithms.

Scanner interface 16 provides new handwriting images. Scanner 24 scans a graphical image and sends the resulting image data to scanner interface 16. Scanner interface 16, in turn, develops an approximation to the image based on vectors and passes it to handwriting generator 12. Handwriting generator 12 receives, compresses and saves the resulting vector approximation to storage device 18. Handwriting generator 12 also associates the vector approximation with a character string and adds the string to a list of character strings already existing in a dictionary within handwriting generator 12.

Figure 2:
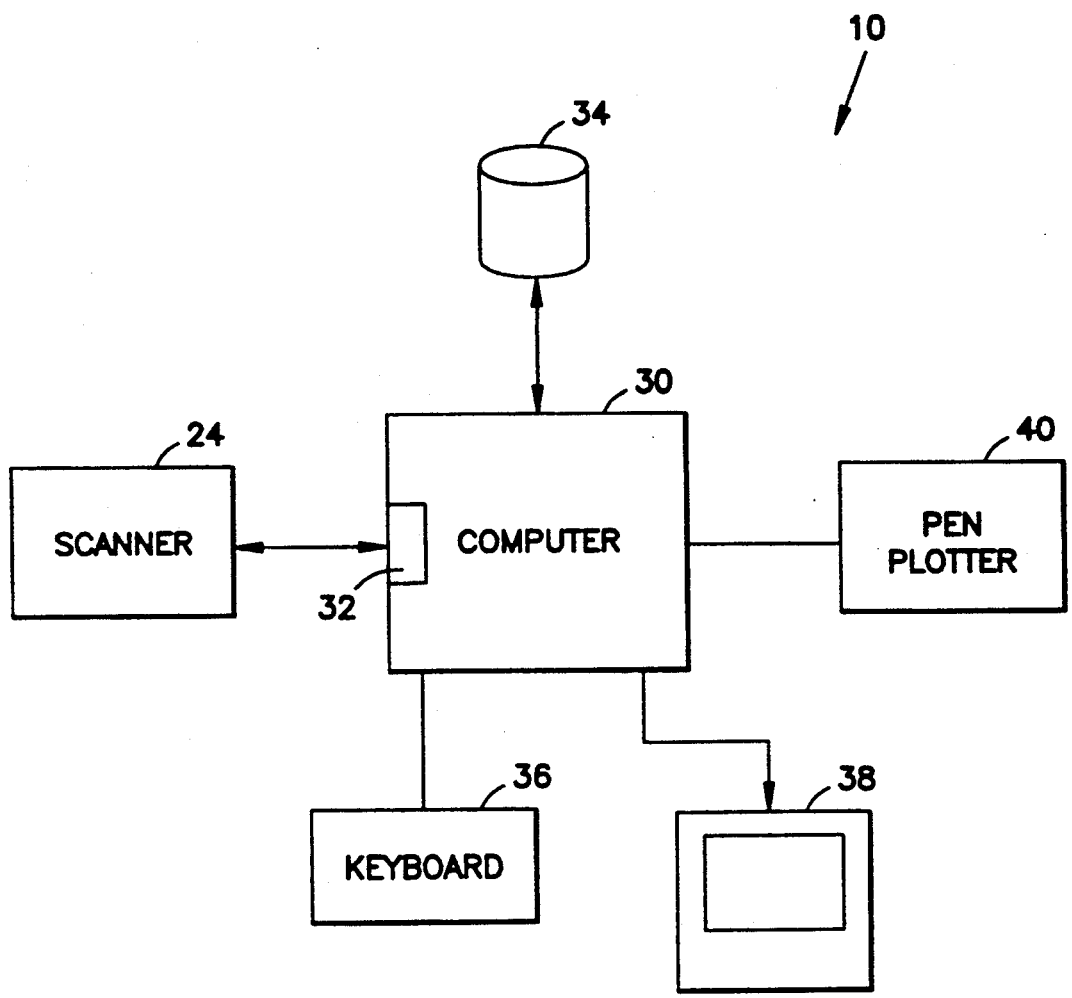
FIG. 2 is a block diagram representative of the preferred embodiment of a system for simulating handwriting according to the present invention.

The preferred embodiment of personalized handwriting system 10 is illustrated in FIG. 2. Computer 30 is connected to scanner 24 through scanner interface board 32. Computer 30 is also connected to fixed disk drive 34 for storage of the handwriting analogues, to pen plotter 40 for production of hard copy output and to keyboard 36 and monitor 38 for user interface.

In this embodiment, computer 30 performs the vector approximation performed by scanner interface 16 of FIG. 1. The resulting vector approximation is saved to fixed disk 34 and a character string representative of the vector approximation is added to a dictionary maintained in the memory of computer 30. A text document is entered and edited using keyboard 36, monitor 38 and a standard word processing program (not shown) on computer 30. Computer 30 converts the resulting document into a handwritten document using the method of the present invention. The resulting handwritten document can be saved to fixed disk 34 or printed to pen plotter 40.

Pen plotter 40 is the preferred hard copy output device for the present invention. A pen plotter equipped with the proper pen and paper will provide the most realistic handwritten document. In the preferred embodiment, vector approximations to handwriting analogues are stored in an format that is easily converted to HPGL for plotting with a pen plotter or sending to a Postscript ™ printer. Support is included for bit-mapped devices such as dot matrix and some laser printers but writing to a bit-mapped device requires preprocessing with an algorithm provided that converts the vector approximation to a bit mapped format.

Figure 3:
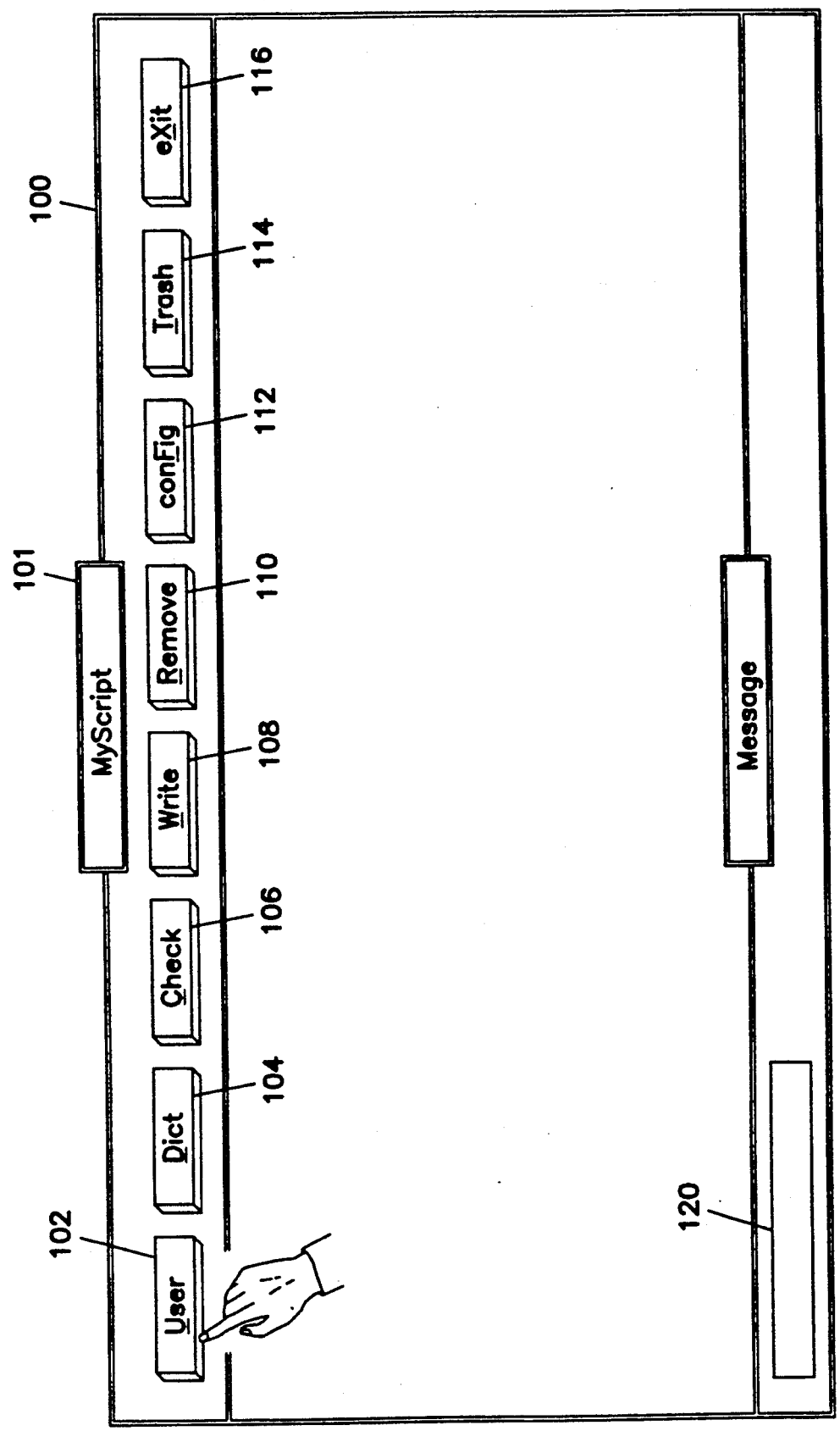
FIG. 3 is a representation of the computer screen display of the main menu.

In the preferred embodiment, personalized handwriting system 10 is controlled by a document conversion program executing on computer 30. The program is activated by the user. Upon program activation, computer 30 displays program choices available to the user. A representative main menu screen display 100 is illustrated in FIG. 3. The program being executed is displayed in box 101 at the top of the screen display. In this embodiment, the program is identified by the trademark, MyScript ™. Program choices are depicted as buttons arrayed beneath box 101. Buttons that can be selected include User 102, Dict 104, Check 106, Write 108, Remove 110, conFig 112, Trash 114 and eXit 116. A cursor 118 points at the currently selected button. A message 120 displays a short description of the function of the currently selected button.

Buttons 102 through 116 can be selected either by moving cursor 118 to a button and pressing Enter or by depressing the letter key corresponding to the underlined letter in the button descriptor. Selection of a button causes the execution of its underlying function.

User button 102 is used to select the dictionary to be installed. Dict button 104 is used to create, edit and remove handwriting images from the installed dictionary. Check button 106 is used to compare a text document to the installed dictionary and to create a temporary file containing the simulated handwritten version of the text document. Write button 108 is used to permit the display, edit and printing of the simulated handwritten document. Remove button 110 is used to delete a dictionary from fixed disk drive 34. The conFig button 112 is used to add or delete a scanner 24 or a hard copy output device 22 to the system. Trash button 114 is used to erase saved simulated handwriting documents from fixed disk drive 34 and eXit button 116 is used to terminate the program.

Figure 4:
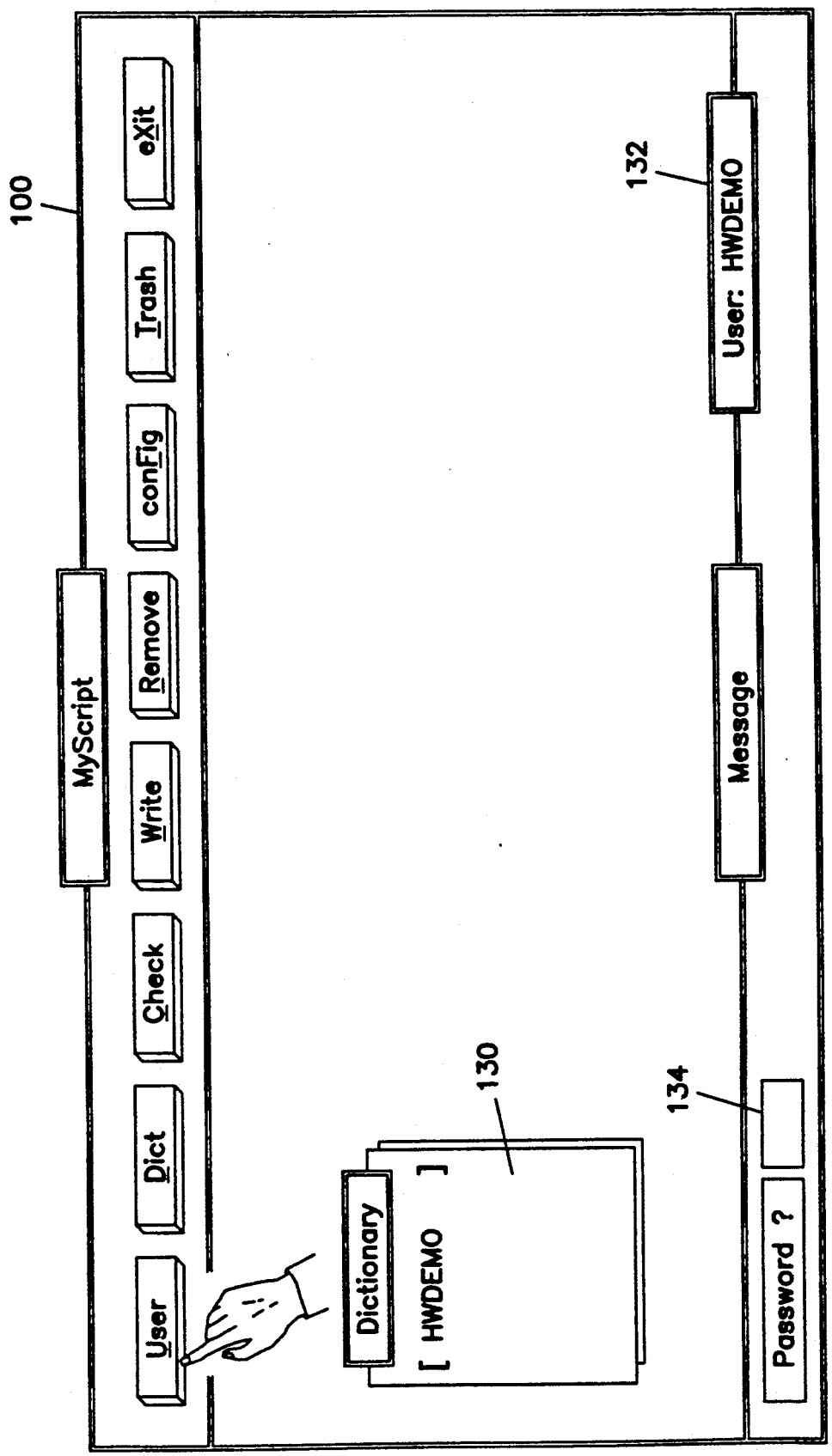
FIG. 4 is a representation of the computer screen displayed after selection of the User button from within the document conversion program.

FIG. 4 illustrates the result of selecting User button 102. A directory window 130 containing a list of available dictionaries is displayed. The user can then use the UP and DOWN arrows to select the appropriate dictionary. As a dictionary is selected its name is displayed in user message box 132 and highlighted in the list within directory window 130. In the preferred embodiment, access to dictionaries is controlled through the use of a password. Entry of the password is displayed by moving a cursor within password message box 134 to the right one space as each letter of the password is entered. On correct entry of the password, the appropriate dictionary is installed and the main menu of FIG. 3 is displayed.

Once a dictionary is selected and installed the user can proceed to converting a document. First, the document must be checked against the installed dictionary. The user selects the Check 106 button in FIG. 3. A directory window is displayed containing a list of available text documents. The user selects the appropriate text document. Computer 30 then compares the words, letters and symbols from the text document against the words, letters and symbols contained in the installed dictionary. Items that are not present in the installed dictionary are composed from other character strings. Computer 30 then saves the items used in the document and the handwriting images associated with those items to temporary files and returns to the main menu of FIG. 3.

The program replaces composes missing words by first decomposing the word into strings present in the installed dictionary. In one embodiment, the program decomposes a missing word by searching the dictionary for the longest character string in the word that is available in the dictionary. That string is replaced and the program searches for the longest string remaining in the word and available in the dictionary. This continues until individual letters are used to complete the word. In another embodiment, the program looks for a solution with the fewest character strings. The character strings and letters are Joined to form a handwriting image representative of the missing word.

Documents can be rendered in a completely different handwriting style by simply installing a different dictionary and executing the Check function on the original text document. This flexibility can also be useful in converting words or phrases to symbols or to handwriting in other languages. An example would be the translation of a text "Thank you" to a handwritten version of the equivalent in Japanese or French.

Figure 5:
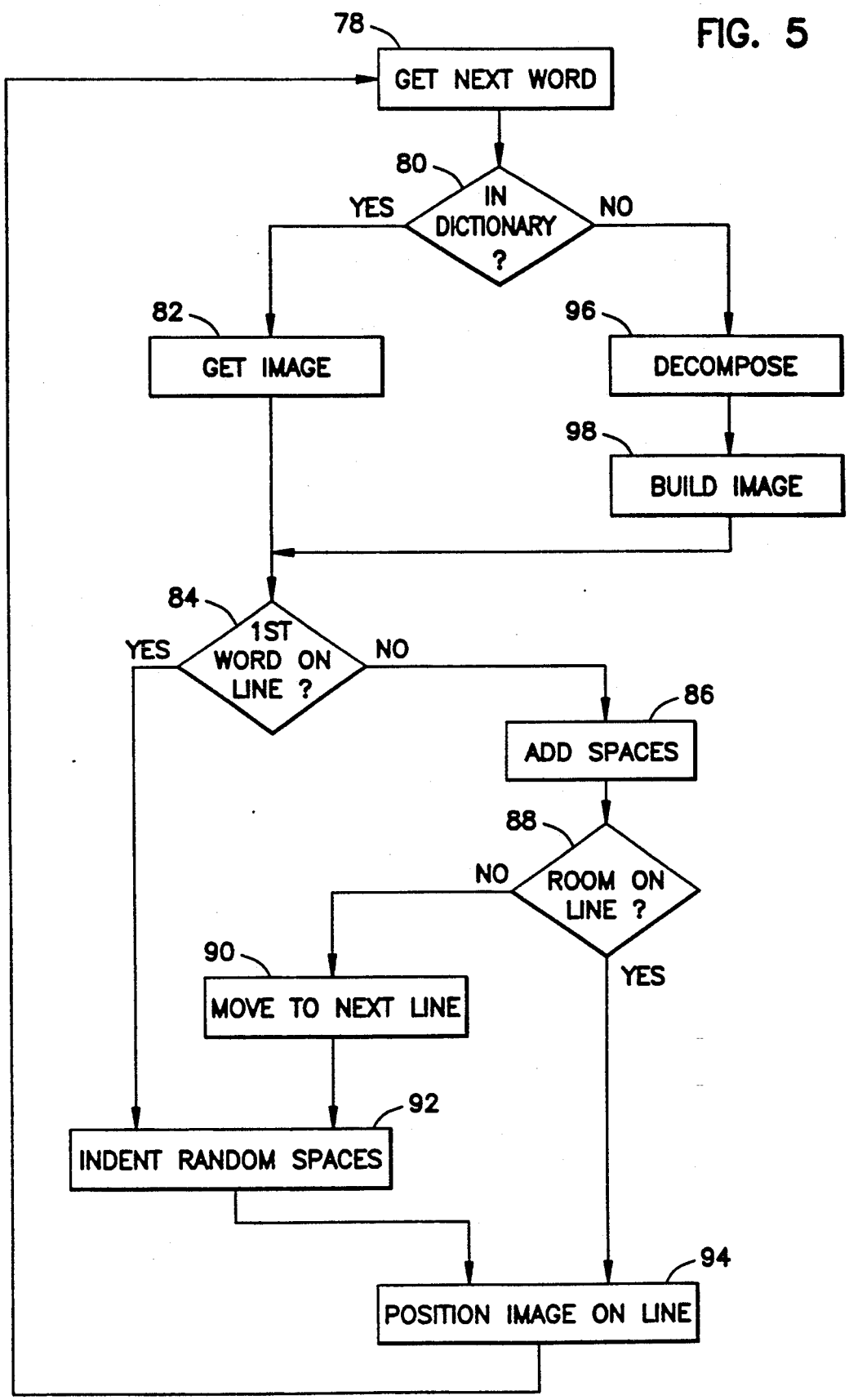
FIG. 5 is a flow diagram representative of the steps taken to replace words within a document according to the present invention.

FIG. 5 illustrates the steps computer 30 goes through in converting a text document to a simulated handwritten document. The routine is entered at 78 where the first character string in the document is read. That character string is compared at 80 to a list of character strings in the installed dictionary. If there is a match, at 82 the appropriate handwriting image is retrieved. At 84, a check is made to determine if this is the first character string on the current line. If so, the program moves to 92 where a random number of spaces is inserted and control moves to 94 for positioning of the handwriting image on the line. If this is not the first word on the line, a random number of spaces is generated at 86 for spacing relative to the previous word and at 88 a check is made to see if room remains on the line. If room remains, control moves to 94 where the program places the handwriting image on the line before returning to 78 for the next character string. If no room remains on the line, the program inserts a line feed at 90 before moving to 92 and then to 94.

FIGS. 6a through 6e illustrate the combination of joinable words and letters to form words not included in the installed dictionary. In the present invention, a handwriting image associated with a character string can carry additional information in the form of a head and a tail. Heads and tails define how an image should be joined with adjacent images in the composing of character strings not found in the installed dictionary. The head describes how that image should be joined with an image placed adjacent and to the left. The tail describes how the image should be joined with an image placed adjacent and to the right. In joining handwriting images formed from adjacent character strings, the tail of the first character string is connected to the head of the second character string by a curve fitting algorithm. In the preferred embodiment, a Bezier curve is drawn using the marking points that define the tail and the adjacent head.

FIGS. 6a, 6b and 6c illustrate handwriting images that could be associated with the character strings "c", "at" and "e", respectively. In FIG. 6a, handwriting image 50 for the letter "c" is shown as a solid line. The head 52 of "c" is shown as a sequence of head marking points 52a through 52d. The tail 54 of "c" is shown as a sequence of tail marking points 54a through 54c. In FIG. 6b, handwriting image 56 for the character string "at" is shown as a solid line. The head 58 of "at" is shown as a sequence of head marking points 58a through 58d. The tail 60 of "at" is shown as a sequence of tail marking points 60a through 60c. In FIG. 6c, handwriting image 62 for the letter "e" is shown as a solid line. The head 64 of "e" is shown as a sequence of head marking points 64a and 64b. The tail 66 of "e" is shown as a sequence of tail marking points 66a through 66c.

FIG. 6d illustrates the combination of handwriting images 50 and 56 to form a new handwriting image representative of the concatenation of the character strings "c" and "at". As can be seen in FIG. 6d, the tail 54 of the letter "c" is placed proximate to the head 58 of the character string "at". A curve smoothing algorithm is applied so as to draw a curve beginning at tail marking point 54a and ending at head marking point 58a. The intermediate points 54b and 54b and 58b through 58d are used to resolve intermediate points in the joining curve.

Likewise, FIG. 6e illustrates the combination of handwriting images 56 and 62 to form a new handwriting image representative of the concatenation of the character strings "at" and "e". The tail 60 of the character string "at" is placed proximate to the head 64 of the letter "e" and a curve smoothing algorithm applied to draw a curve beginning at tail marking point 60a and ending at head marking point 64a. The intermediate points 60b, 60c and 64b are used to resolve intermediate points in the joining curve.

In another embodiment, more compute intensive curve fitting algorithms are performed during the joining of adjacent images. The algorithm used depends on the amount of overlap between a tail and the head of the adjacent image. If there is complete overlap, the images are place adjacent to each other with no attempt at joining. The head and tail information is not used.

If there is partial or no overlap, then the program uses a Bezier curve or a predetermined vector to connect the head and the tail. In one embodiment, if the amount of overlap is less than 25% then a Bezier curve connects the head to the tail. If there is between 25% and 75% overlap, a predetermined vector is used to interpolate between the head and tail marking points. If there is greater than 75% overlap, the head and tail information is ignored and the images are placed adjacent to each other with no connection between them. The result will be a concatenation of the two images with negligible space between them.

The ability to compose handwriting images characteristic of character string not available in the installed dictionary is an important feature. It reduces storage requirements by allowing a more flexible approach to forming handwriting images. It also makes the system more robust by not requiring the presence of a handwriting image for each word used in a text document. A handwriting image formed in the above manner is a believable composition that simulates the handwriting of the missing word in a style predicted by other handwriting images in the installed dictionary.

The user can produce a hard copy of the simulated handwritten document. To do this, the user selects the Write 108 button in FIG. 3. Computer 30 displays a directory window containing a list of available text documents. The user selects the appropriate text document and a Write screen is displayed.

Figure 7:
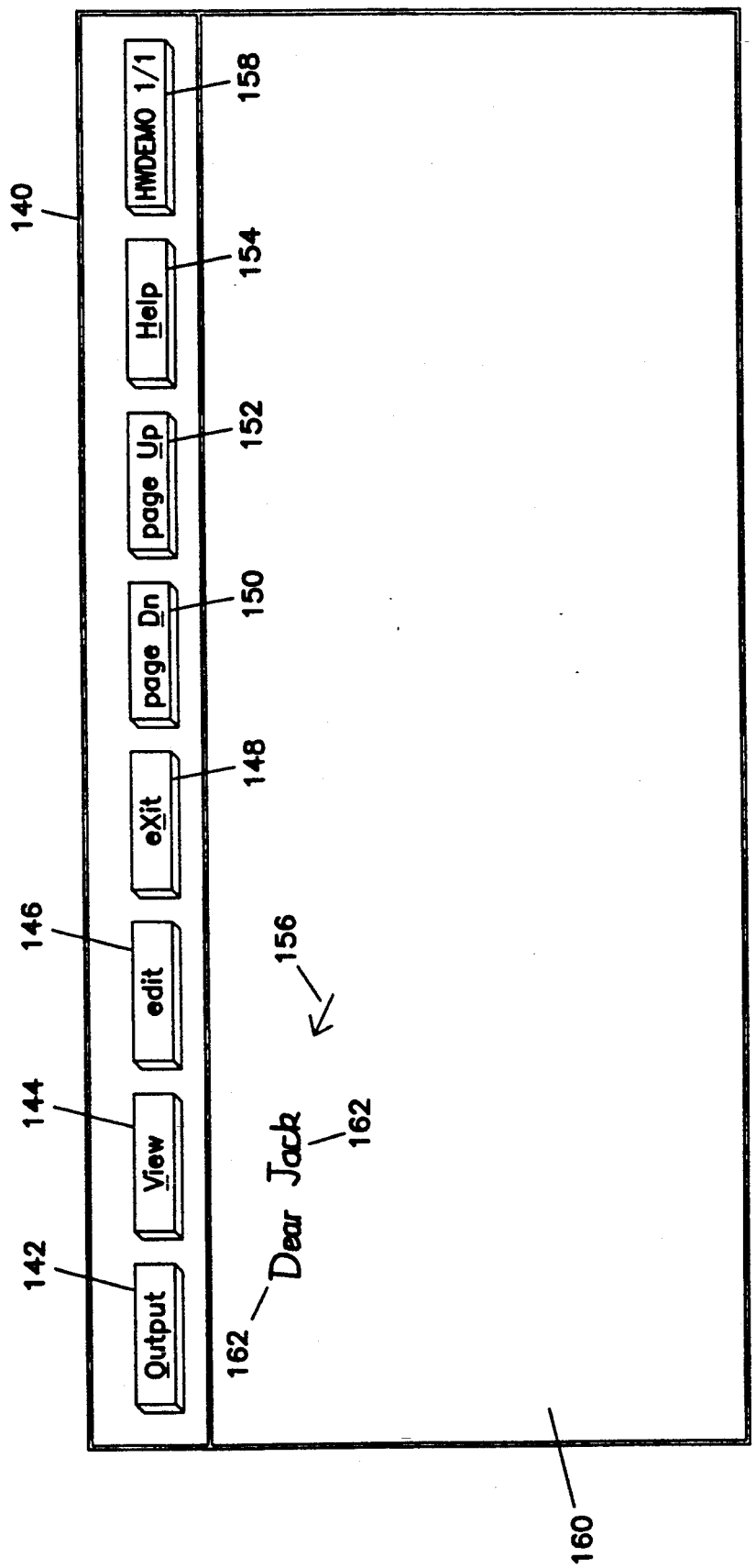
FIG. 7 is a representation of the computer screen displayed after selection of the Write button of FIG. 3.

A representative Write screen 140 is illustrated in FIG. 7. Program choices are depicted as buttons arrayed at the top of the screen. Buttons that can be selected include Output 142, View 144, edit 146, eXit 148, page Dn 150, page Up 152 and Help 154. An arrow cursor 156 can be directed at any point on the screen. A message box 158 contains the name of the installed dictionary and the page number of the document being displayed. The simulated handwritten document itself is displayed within display area 160 as a sequence of word images 162.

Buttons 142 through 154 can be selected either by moving cursor 156 to a button and pressing Enter or by depressing the letter key corresponding to the underlined letter in the button descriptor. Selection of a button causes the execution of its underlying function.

Output button 142 is used to send the handwritten document to a printer or plotter. View button 144 is used to refresh display area 160, change margins of the simulated handwritten document and select full or half page display of the handwritten document. Edit button 146 is used to manipulate handwriting images within the simulated handwritten document. Options include copying, rotating, deleting and underlining. Also, handwriting images can be modified to have the appearance of being crossed or blotted out. EXit button 148 is used to terminate the Write function and return to the main menu of FIG. 3. Page Dn button 150 and Page Up button 152 are used to scroll to the next or previous half page of the document. Help button 154 displays a short summary of the operation of buttons 142 through 154.

In the preferred embodiment, the user can modify the installed dictionary to add or delete handwriting images. This can be done from within the document conversion program through the Dictionary Maintenance function. The Dictionary Maintenance function is activated by selecting the Dict button 104 in the main menu illustrated in FIG. 3.

Figure 8:
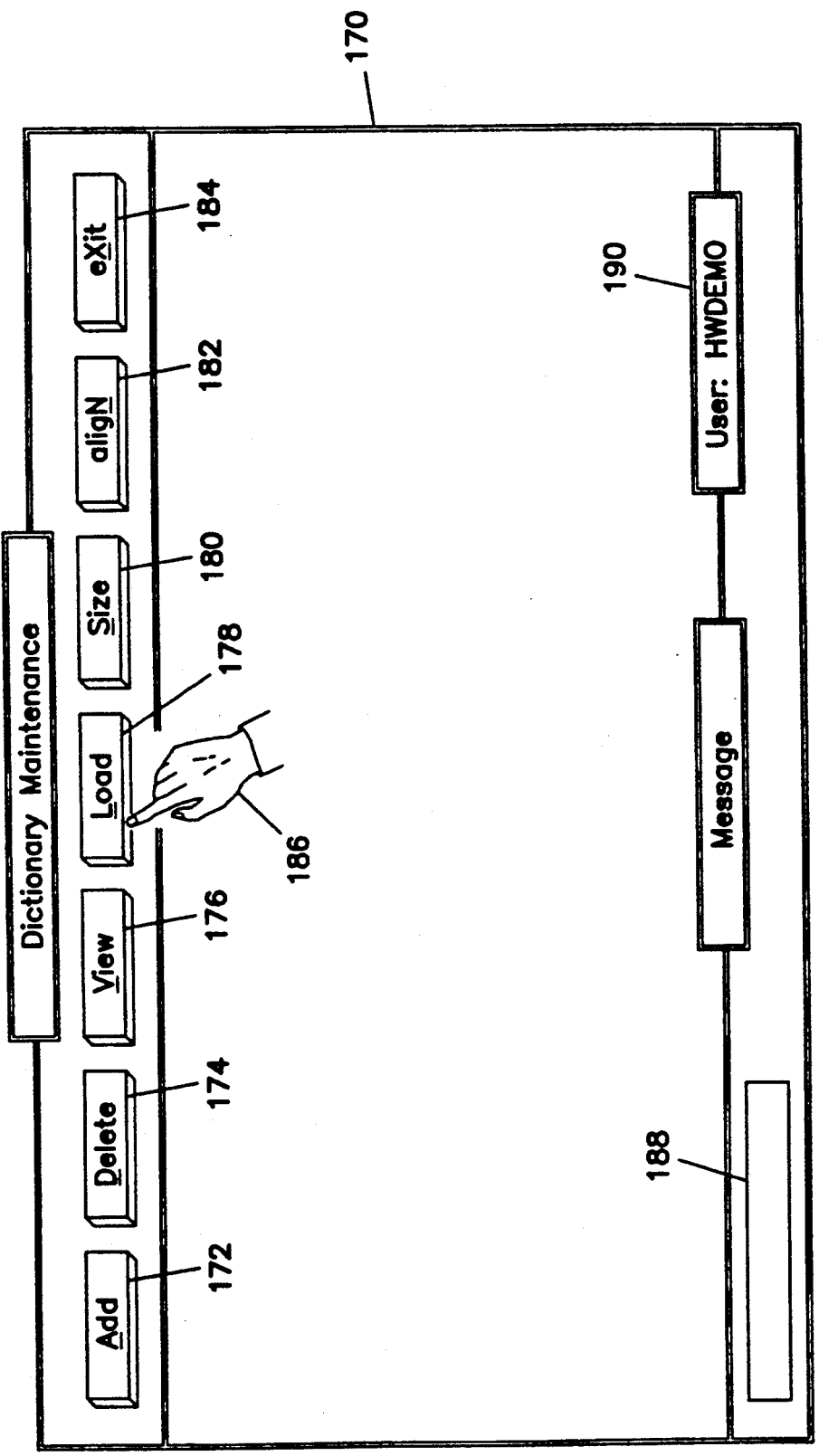
FIG. 8 is a representation of the computer screen displayed after selection of the Dict button of FIG. 3.

A representative Dictionary Maintenance screen 170 is illustrated in FIG. 8. Program choices are depicted as buttons arrayed at the top of the screen. Buttons that can be selected include Add 172, Delete 174, View 176, Load 178, Size 180, aligN 182 and eXit 184. A cursor 186 points at the currently selected button. A general message box 188 displays a short description of the function of the currently selected button. A dictionary message box 190 displays the name of the currently installed dictionary.

Buttons 172 through 184 can be selected either by moving cursor 186 to a button and pressing Enter or by depressing the letter key corresponding to the underlined letter in the button descriptor. Again, selection of a button causes the execution of its underlying function.

Add button 172 is used to add a single word, letter or symbol to the installed dictionary. Add button 172 also allows the marking of heads and tails on Joinable letters and character strings. Delete button 174 is used to delete handwriting images from the installed dictionary. View button 176 is used to view a handwriting image from the installed dictionary. Load button 178 is used to display a file of the character strings in a converted text document that did not have associated handwriting images in the installed dictionary at the time of the conversion. Size button 180 is used to increase or decrease the size of a handwriting image within the installed dictionary. AligN button 182 is used to align a handwriting image in the installed dictionary to a reference baseline. And eXit button 184 is used to terminate the Dictionary Maintenance function and return to the main menu.

Figure 9:
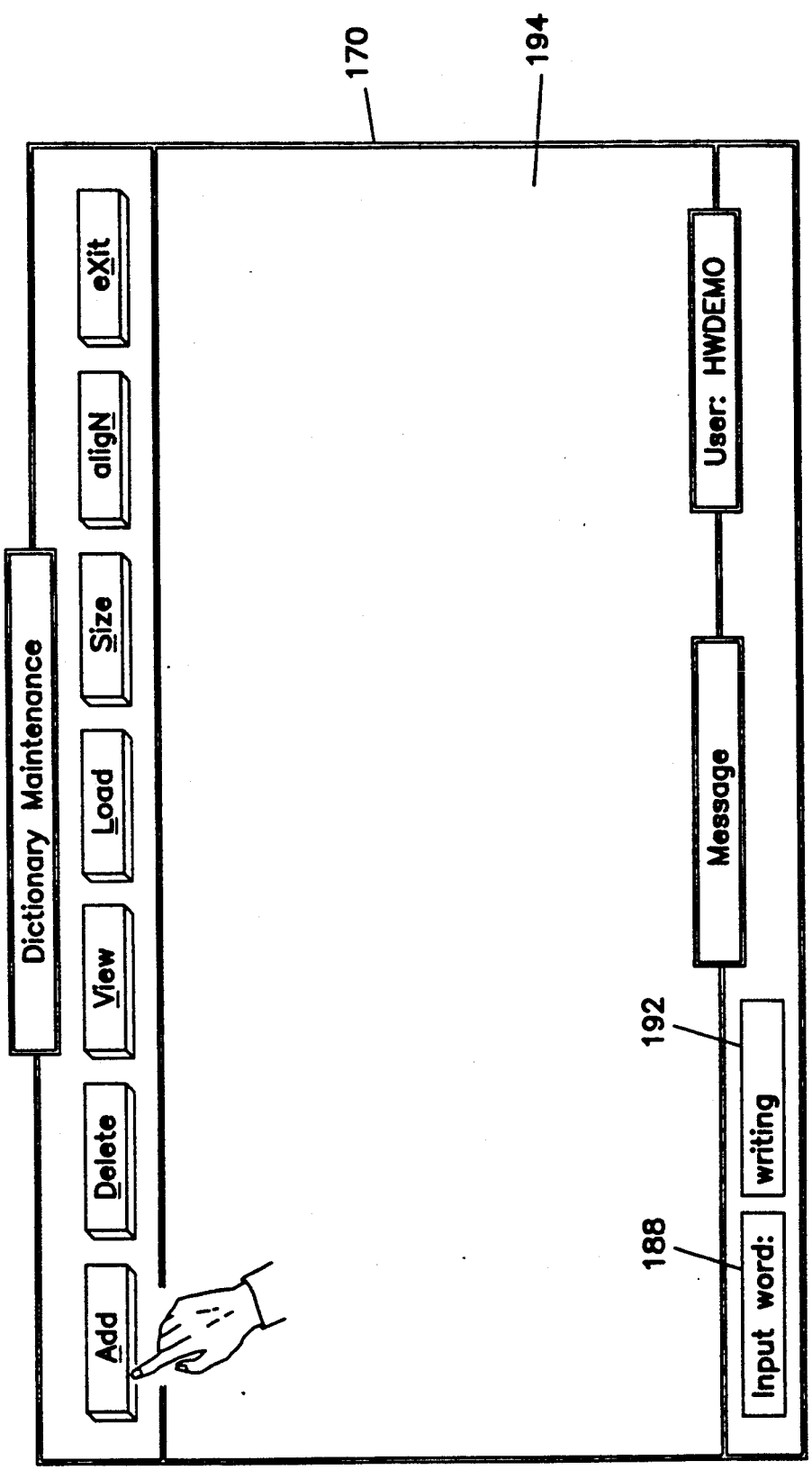
FIG. 9 is a representation of the computer screen displayed after selection of the Add button of FIG. 3.

FIG. 9 illustrates the result of selecting Add button 172 in the Dictionary Maintenance screen. General message box 188 displays a message such as "Input word:" and the user enters the character string to be added to the installed dictionary. As the character string is entered it is displayed in entry message box 192. The user is then prompted to scan the handwriting image to be associated with the character string and, after scanning, the scanned image appears within display area 194 on Dictionary Maintenance screen 170.

Figure 10:
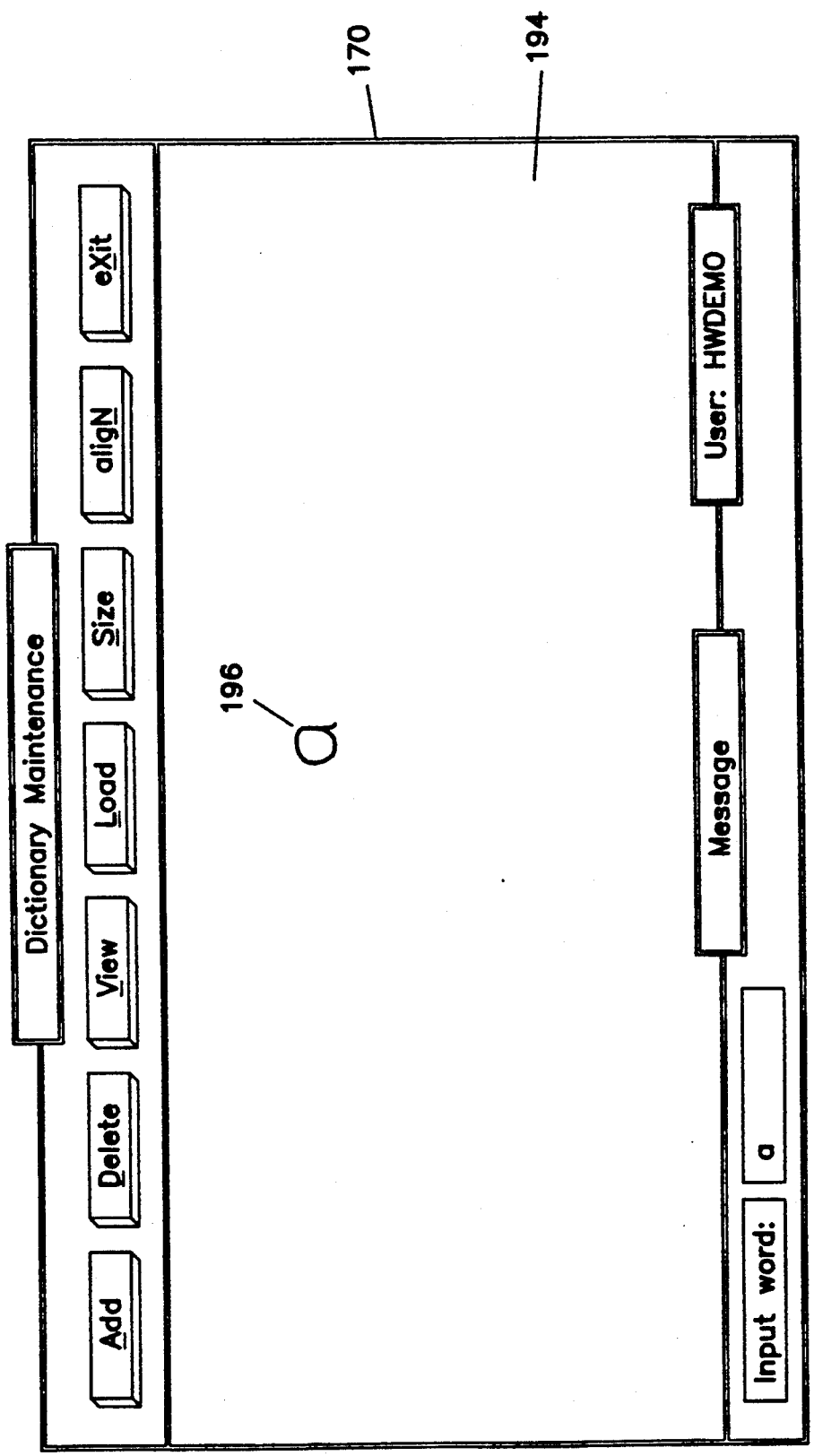
FIG. 10 is a representation of the computer screen displayed after scanning of a letter during execution of the Add function within the Dictionary Maintenance routine.

FIG. 10 illustrates the result of scanning the letter "a" using the Add button on Dictionary Maintenance screen 170. The handwriting image 196 associated with the letter "a" is displayed within display area 194. The user can then save the handwriting image to the installed dictionary or can, if desired, add the additional head and tail information needed to Join this image to an adjacent image.

FIGS. 11a through 11h illustrate the marking of the head and the tail during the Add function to permit joining of the added character string to other strings. Heads and tails are defined as series of points extending outward and anchored at the image. Care should be taken in the drawing of heads and tails to avoid additional flourishes that could lead to odd shaped curves when joined by the curve smoothing algorithm. Once the user is satisfied with the result, the handwriting image with its head and tail information is written to the installed dictionary.

In the preferred embodiment, a thinning algorithm based on Medial Axis Thinning is used to convert the handwriting image to raster data of single pixel width during the process of adding the image to the installed dictionary. Huffman coding compresses the resulting image prior to saving it to disk.

Figure 11A:
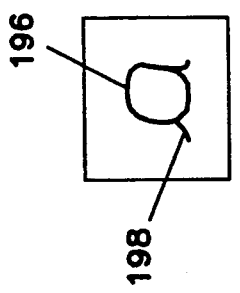
FIGS. 11a through 11h illustrate the formation of a head and a tail on a scanned letter during execution of the Add function within Dictionary Maintenance.
Figure 11B:
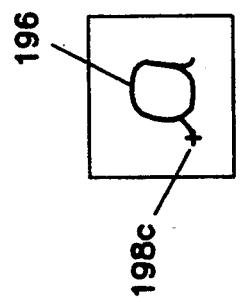
Figure 11C:
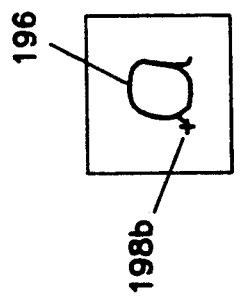
Figure 11D:
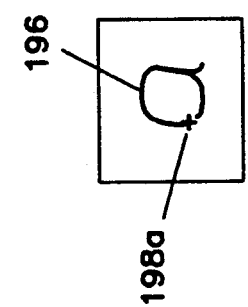

FIGS. 11a through 11d illustrate the drawing of a head 198. Head 198 is drawn by placing a first marking point 198a on the image where a previous letter would flow into the first character. This is illustrated in FIG. 11a. Additional marking points are defined that describe the curve appropriate to the style of writing. FIGS. 11b and 11c illustrate the addition of two more marking points 198b and 198c. The number of points is up to the user. The result is head 198 as illustrated in FIG. 11d.

Figure 11E:
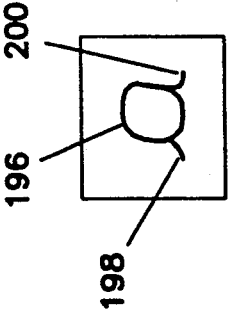

FIGS. 11e through 11h illustrate the drawing of a tail 200. Tail 200 is drawn by placing a first marking point 200a on the image where the letter would flow into the next adjacent character. Marking point 200a may simply be a point on the end of an existing tail as is illustrated in FIG. 11e. On the other hand, the user may prefer to place a different style tail on some letters depending on whether they are or are not followed by another letter. Then marking point 200a would be placed somewhere else on the letter image and the resulting marked tail would diverge from the default image tail. Then, if the letter is joined to an adjacent trailing letter, the marked tail is used. Otherwise, the default image tail is used.

Figure 11F:
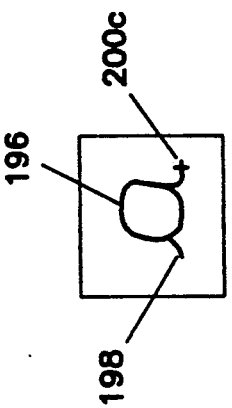
Figure 11G:
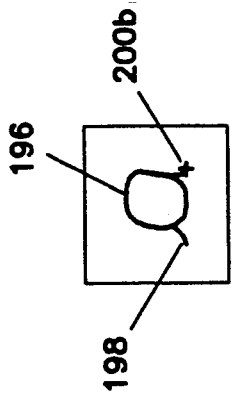
Figure 11H:
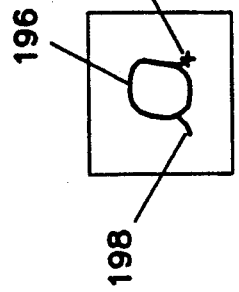

As in head drawing, the user defines the number of additional marking points needed to define a curve appropriate to the style of writing. FIGS. 11f and 11g illustrate the addition of two more marking points 200b and 200c. The result of marking the head and tail is illustrated in FIG. 11h.

Figure 12:
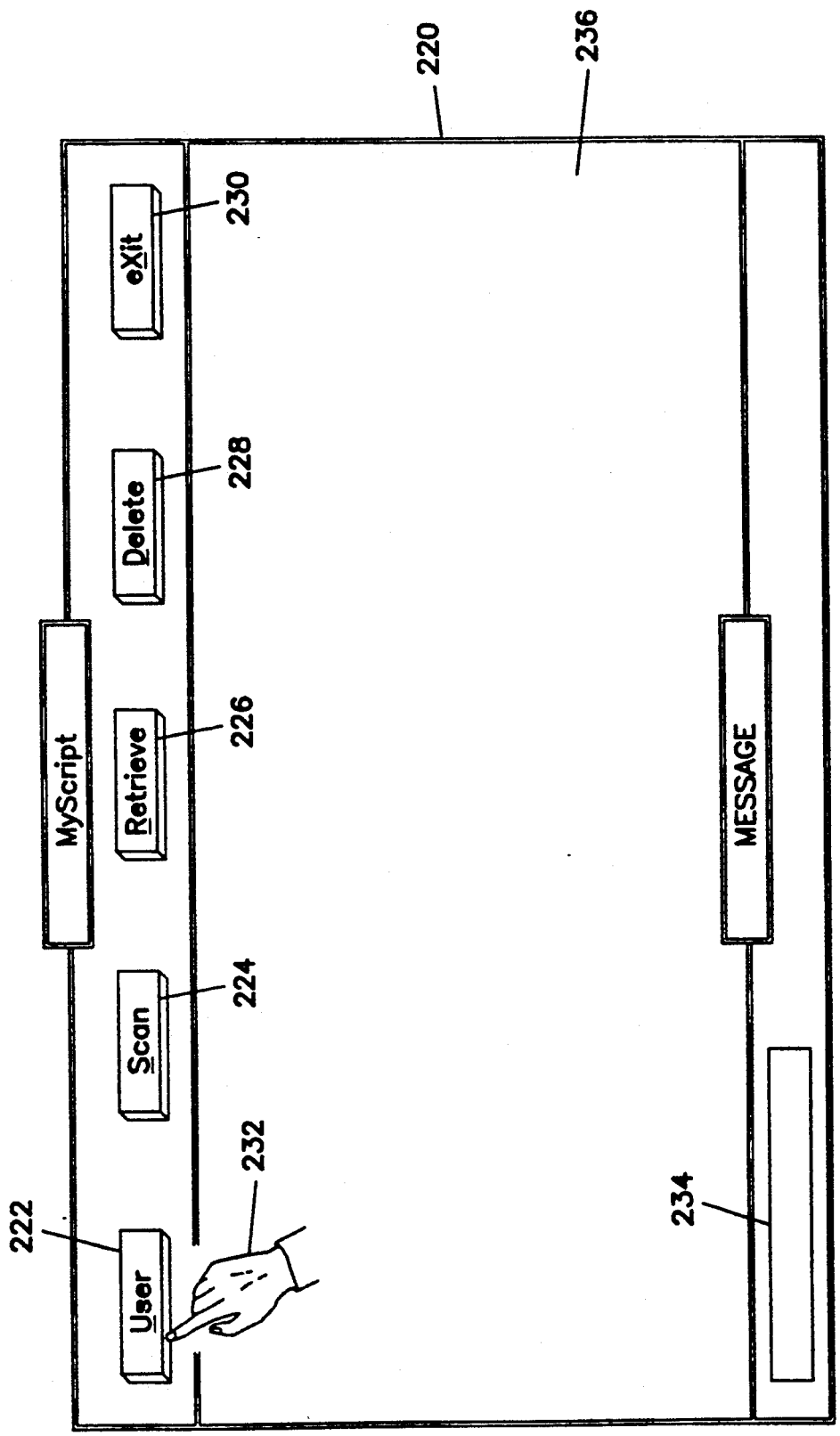
FIG. 12 is a representation of the computer screen displayed upon activation of the page scanning program.

In the preferred embodiment, the user is given an optional method of adding multiple handwriting images to a dictionary at a time. This is accomplished through the use of a page scanning program provided. Upon activation of the page scanning program, computer 30 displays program choices available to the user. A representative main menu screen display 220 is illustrated in FIG. 12. Screen display 220 contains display area 236. Program choices are depicted as buttons arrayed at the top of display 220. Buttons that can be selected include User 222, Scan 224, Retrieve 226, Delete 228 and eXit 230. A cursor 232 points at the currently selected button. A message 234 displays a short description of the function of the currently selected button.

Buttons 222 through 230 can be selected either by moving cursor 232 to a button and pressing Enter or by depressing the letter key corresponding to the underlined letter in the button descriptor.

User button 222 is used to select the dictionary to be installed. Scan button 224 is used to initiate a scan of a page of handwriting images. Retrieve button 226 is used to load a saved page of scanned handwriting images in order to permit selection and addition of images to the installed dictionaries. Delete button 228 is used to delete a saved page of scanned handwriting. EXit button 230 is used to terminate the program.

Figure 13:
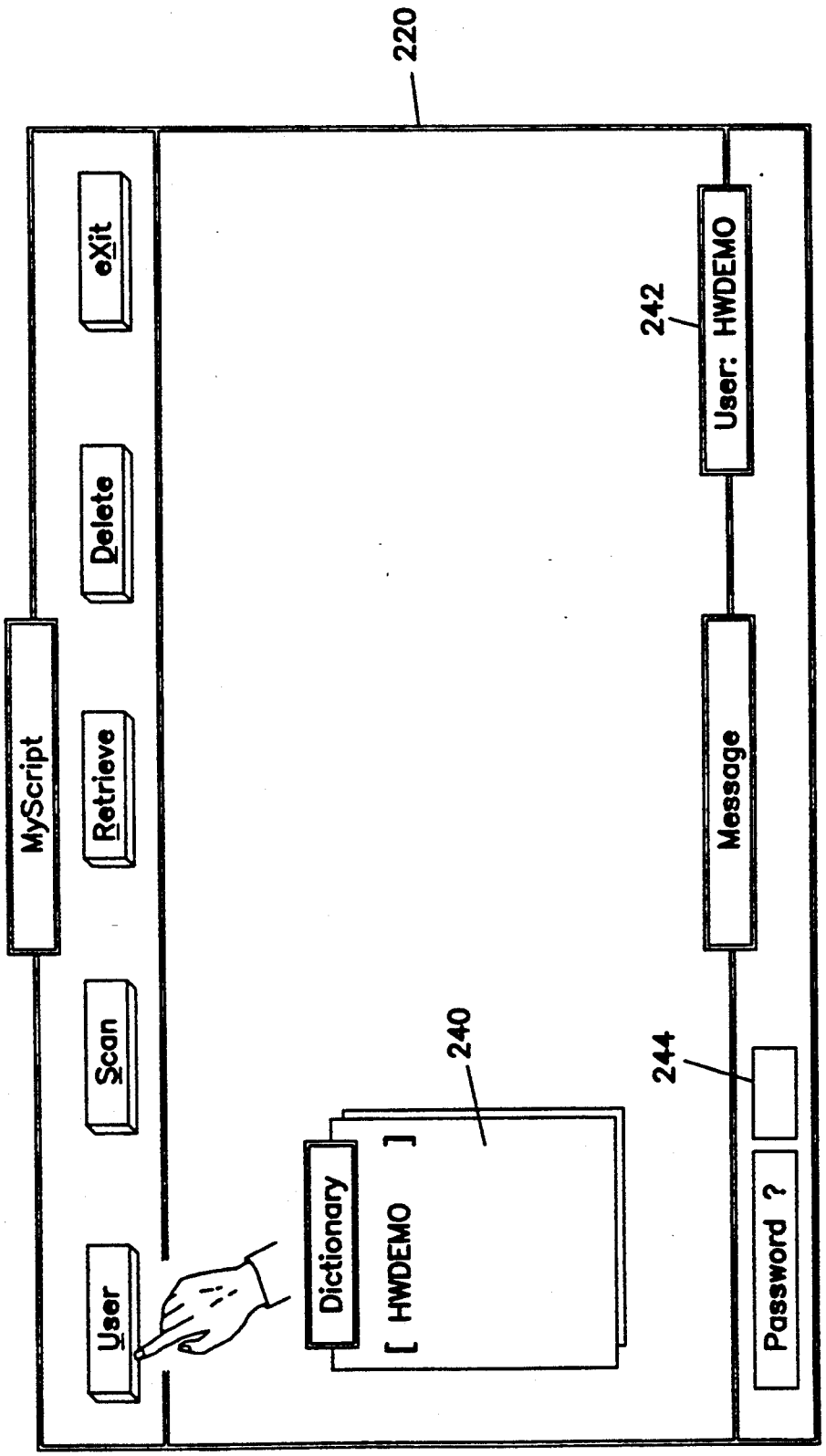
FIG. 13 is a representation of the computer screen displayed after selection of the User button from within the page scanning program.

FIG. 13 illustrates the result of selecting User button 222. A directory window 240 containing a list of available dictionaries is displayed. The user can then use the UP and DOWN arrows to select the appropriate dictionary. As a dictionary is selected its name is displayed in user message box 142 and highlighted in the list within directory window 240. As in the case of the document conversion program, in the preferred embodiment, access to dictionaries is controlled through the use of a password. Entry of the password is displayed by moving a cursor within password message box 244 to the right one space as each letter of the password is entered. On correct entry of the password, the appropriate dictionary is installed and the main menu of FIG. 12 is displayed.

Once a dictionary is installed the user can proceed to scanning a full page of handwriting images. The user selects Scan button 224 in FIG. 12. A prompt appears in message box 234 asking the user to scan the handwriting images. The user scans the page and the images appear within display area 236. The user can then select one or more images, add head or tail information as described above, associate the images with character strings and save the resulting string-image pairs to the installed dictionary. When finished, the user exits the Scan function and can, if desired, save the scanned page to fixed disk 34.

To use the present invention, the user creates a dictionary of personal handwriting and assigns it a password. The user then scans in samples of his own handwriting and associates the images with the appropriate text, making sure to include the letters of the alphabet, commonly used words and appropriate punctuation marks. Next, the user edits the handwriting images scanned to correct the sizing and alignment and to add heads or tails, if desired. The resulting dictionary is saved to disk.

The user can now install the dictionary and convert text documents to simulated handwritten documents. The user enters a text document using a standard word processing program and invokes the Check function to convert text to the handwriting images contained in the installed dictionary. Handwriting images of character strings not contained in the installed dictionary are composed using letters and character strings contained in the installed dictionary. The resulting document can be viewed on screen. If a composed handwriting image is inadequate, the user can scan in the appropriate handwriting sample, add it to the installed dictionary and repeat the conversion process. Otherwise, the user can edit the resulting document, plot it to a pen plotter or print it to a dot matrix or laser printer. The result is a personal letter indistinguishable from one written by hand.

It will be appreciated that the present invention has numerous applications. The present invention has application wherever the user might want to output his or her own handwriting as opposed to standard type fonts or predetermined calligraphy. The present invention also has applications where the user may want to substitute symbols or images for certain character strings.

Although the present invention has been described with reference to the preferred embodiments, those skilled in the art will recognize that changes may be made in form and detail without departing from the spirit and scope of the invention.

What is claimed is:

1. A computer system for simulating handwriting in the production of output documents, comprising:
   wordprocessing means for providing an original document including a plurality of words;
   means for storing handwritten graphical representations of character strings in memory of the computer system to provide a dictionary in the memory of the computer system associating the character strings with their handwritten graphical representations;
   string replacement means connected to said input means and said dictionary means for decomposing the words from said original document into word character strings, associating the word character strings with the character strings represented in said dictionary means and replacing the words with their handwritten graphical representation so as to product an output document of simulated handwriting, the string replacement means including means for:
   associating a word character string with a plurality of character strings in the dictionary comprising the word character string if no corresponding character string exists in the dictionary for the word character string;
   connecting the handwritten graphical representations of said plurality of character strings in the dictionary so as to form a contiguous graphical representation of the word character string; and
   displaying and modifying said simulated handwritten document in order to effect changes in the placement and appearance of the handwritten graphical representation of character strings in said simulated and written document; and
   means for outputting the simulated handwritten document to an output device.

2. The system according to claim 1 wherein said system further comprises hard copy output means connected to said string replacement means for reducing the output document to hard copy.

3. The system according to claim 2 wherein said hard copy output means is a pen plotter.

4. The system according to claim 2 wherein said hard copy output means is a laser printer.

5. The system according to claim 2 wherein said hard copy output means is a dot-matrix printer.

6. A method for simulating handwriting in a computer generated document, comprising:
   creating handwritten graphical representations of character strings;
   storing the handwritten graphical representations of the character strings in memory of the computer to provide a dictionary in the memory of the computer associating the character strings with their handwritten graphical representations;
   providing a document including a plurality of words;
   decomposing words in said document into one or more word character strings;
   replacing the word character strings with their associated graphical representation;
   associating a word character string with a plurality of character strings from the dictionary comprising the word character string if no corresponding character string exists in the dictionary for the word character string and connecting adjacent graphical representations of said plurality of character strings in the dictionary to form a contiguous graphical representation of the word character string; whereby a document of simulated handwriting is created;
   displaying and modifying said simulated handwritten document in order to effect changes in the placement and appearance of the handwritten graphical representation of character strings in said simulated handwritten document as desired; and
   outputting said simulated handwritten document to an output device.

7. The method according to claim 6 wherein the step of providing an image comprises drawing said image on a computer screen with a mouse.

8. The method according to claim 6 wherein the step of providing a document comprises providing an ASCII representation of said document.

9. The method according to claim 6 wherein the step of providing a document comprises creating and saving said document using a word processing program.

10. In a system for simulating a plurality of handwriting styles in converting text to simulated handwritten documents, a method of composing a simulated handwritten document comprising:
    providing a test document;
    loading a dictionary including a plurality of personalized handwritten graphical representations of words, letters and punctuation marks into memory of the system;
    checking the text document against said dictionary and generating a list of words, letters and punctuation marks not included in said dictionary;
    composing words present in the text document for which their are no corresponding words in the dictionary by combining one or more of the words, letters and punctuation marks contained in said dictionary;
    replacing the text document words, letters and punctuation marks with their associated handwritten graphical representations;
    viewing the resulting simulated handwritten document and modifying said simulated handwritten document in order to effect changes in the placement and appearance of the handwritten graphical representation of character strings in said simulated handwritten document as desired; and
    outputting the simulated handwritten document to an output device.

11. The method according to claim 10 wherein the method further comprises writing the resulting simulated handwritten document to a hard copy output device.

12. The method according to claim 10 wherein the method further comprises adding words or parts of words to the dictionary to replace composed words that do not appear authentic.

* * * * *